(12) United States Patent
Shulman

(10) Patent No.: US 11,296,920 B2
(45) Date of Patent: Apr. 5, 2022

(54) HIGH-SPEED SERIAL INTERFACE FOR ORTHOGONAL FREQUENCY DIVISION MULTIPLEXING (OFDM) CABLE MODEMS

(71) Applicant: MaxLinear, Inc., Carlsbad, CA (US)

(72) Inventor: Shaul Shulman, Ramat Gan (IL)

(73) Assignee: MaxLinear, Inc., Carlsbad, CA (US)

( * ) Notice: Subject to any disclaimer, the term of this patent is extended or adjusted under 35 U.S.C. 154(b) by 165 days.

(21) Appl. No.: 15/717,420

(22) Filed: Sep. 27, 2017

(65) Prior Publication Data

US 2019/0058623 A1 Feb. 21, 2019

Related U.S. Application Data

(60) Provisional application No. 62/547,515, filed on Aug. 18, 2017.

(51) Int. Cl.
| | |
|---|---|
| *H04L 27/36* | (2006.01) |
| *H04L 1/00* | (2006.01) |
| *H04W 88/08* | (2009.01) |
| *H04L 27/26* | (2006.01) |
| *H04L 25/49* | (2006.01) |
| *H04B 3/00* | (2006.01) |

(52) U.S. Cl.
CPC .......... *H04L 27/364* (2013.01); *H04L 1/0041* (2013.01); *H04L 1/0045* (2013.01); *H04W 88/085* (2013.01); *H04B 3/00* (2013.01); *H04L 1/0057* (2013.01); *H04L 1/0061* (2013.01); *H04L 25/4908* (2013.01); *H04L 27/2627* (2013.01); *H04L 27/2647* (2013.01)

(58) Field of Classification Search
CPC . H04L 27/364; H04L 27/2627; H04L 1/0045; H04L 27/2647; H04L 1/0061; H04L 1/0057
See application file for complete search history.

(56) References Cited

U.S. PATENT DOCUMENTS

| | | | |
|---|---|---|---|
| 7,606,886 B1 * | 10/2009 | Bechtolsheim | H04L 41/0663 709/223 |
| 8,830,993 B1 * | 9/2014 | Dublin | H04L 49/00 370/376 |
| 2008/0205446 A1 * | 8/2008 | Popescu | A61B 6/56 370/473 |
| 2010/0199158 A1 * | 8/2010 | Friedman | H04L 12/2838 714/807 |
| 2010/0203833 A1 * | 8/2010 | Dorsey | G06Q 50/30 455/41.2 |

(Continued)

OTHER PUBLICATIONS

Altera—Specification and Additional Information, May 2007.*

*Primary Examiner* — Dac V Ha
(74) *Attorney, Agent, or Firm* — Buchalter; Jason W. Croft

(57) ABSTRACT

A high-speed serial interface (HSIF) for communicating between an analog front end (AFE) and a System on a Chip (SoC) digital radio via a bi-directional serial bit connection for an OFDM cable modem includes generating Status Frames and Data Frames to be communicated between the tuner and AFE and sending the generated Status Frames and Data Frames on a continual basis. Each Frame is a 10-bit K.28 Comma Sync word followed by a payload and when no data is queued to be communicated, Status Frames are sent asynchronously as filler frames.

19 Claims, 6 Drawing Sheets

(56) References Cited

U.S. PATENT DOCUMENTS

| | | | |
|---|---|---|---|
| 2012/0213507 A1* | 8/2012 | DeCusatis | H04B 10/07 398/24 |
| 2013/0272357 A1* | 10/2013 | Shulman | H04N 21/6168 375/222 |
| 2014/0153673 A1* | 6/2014 | Shen | H04L 25/03318 375/320 |
| 2014/0169502 A1* | 6/2014 | Lovell | H04L 5/0007 375/324 |
| 2017/0084253 A1* | 3/2017 | Li | G09G 5/393 |
| 2020/0044905 A1* | 2/2020 | Luo | H04L 27/2646 |

* cited by examiner

HIGH-SPEED SERIAL INTERFACE FOR ORTHOGONAL FREQUENCY DIVISION MULTIPLEXING (OFDM) CABLE MODEMS

CROSS-REFERENCE TO RELATED APPLICATIONS

This application claims benefit of priority under 35 U.S.C. § 119(e) to U.S. Patent Application Ser. No. 62/547,515 filed Aug. 18, 2017 by the same inventors and title as the present application, and which is fully incorporated herein by its reference.

FIELD

Embodiments of the present invention relate generally to, but not limited to, communication architectures and methods for communications between an analog front end (AFE) circuit and a digital modulator/demodulator system on a chip (SoC).

BACKGROUND

Certain communication systems use orthogonal frequency division multiplexing (OFDM), sometimes referred to as discrete multi-tone (DMT) transmission. One example of such OFDM communication system is defined by Data Over Cable Service Interface Specification (DOCSIS) 3.1, although the inventive embodiments are not limited thereto. A DOCSIS 3.1 cable modem is customer premises equipment (CPE) that facilitates a customer's, end-to-end digital communications with a network via a high frequency OFDM waveform propagated over a medium such as coaxial cable, fiber or potentially over-the-air (OTA). The cable modem includes both digital processing and "front-end" (i.e., first part of a receiver or transmitter interfaced with the transmission medium) analog processing components to accomplish this. Generally, for example, in a receiver, analog circuitry is used to amplify/de-amplify and frequency-convert signals so that they reach a suitable state to be converted into digital values, after which further signal processing can be performed in the digital domain.

With advances in the design and manufacture of integrated circuits (ICs) more and more traditional analog intermediate frequency (IF) signal processing tasks are handled digitally. Traditional analog tasks, like filtering and up-down conversion are now handled by means of digital filters and digital signal processors (DSPs), sometimes referred to, not necessarily identically because of design choices, as digital radio processors, digital tuners, baseband processors, etc. It is noteworthy that many com systems have "mixed" signal processing designs where signals are processed in both analog and digital domains.

The migration of analog into digital circuits means that the choice of what front-end functions are implemented by analog and digital means generally is discretionary with a system architect and selected based on factors such as required performance, cost, size, and power consumption. Because of the mix of analog and digital technologies, OFDM transceivers generally have an analog front end (AFE) and a separate, digital radio processor/tuner to provide PHY and, if desired, medium access control (MAC) data link layer processing. In this case, the AFE and the digital tuner must have a data interface to accomplish downlink and uplink communications. Moreover, since manufacturers of analog components may differ from those providing digital tuner components, a common interface should be fast, dependable, standardized/uniform and/or known to others.

BRIEF DESCRIPTION OF THE DRAWING FIGURES

Certain circuits, logic operation, apparatuses and/or methods will be described by way of non-limiting example only, in reference to the appended Drawing Figures in which.

DETAILED DESCRIPTION OF THE INVENTION

While reference to example embodiments of the invention may be made to cable modems and related specifications, such as DOCSIS® 3.1 by Cable Television Laboratories, Inc., the high-speed serial interface of the inventive embodiments are not limited thereto and may be used in any protocols, applications or architectures where similar principles may be applied and their use provides similar advantages. Thus the specific description herein is provided only in context of one example implementation and the claims within are in no way limited thereby.

Figure 1:
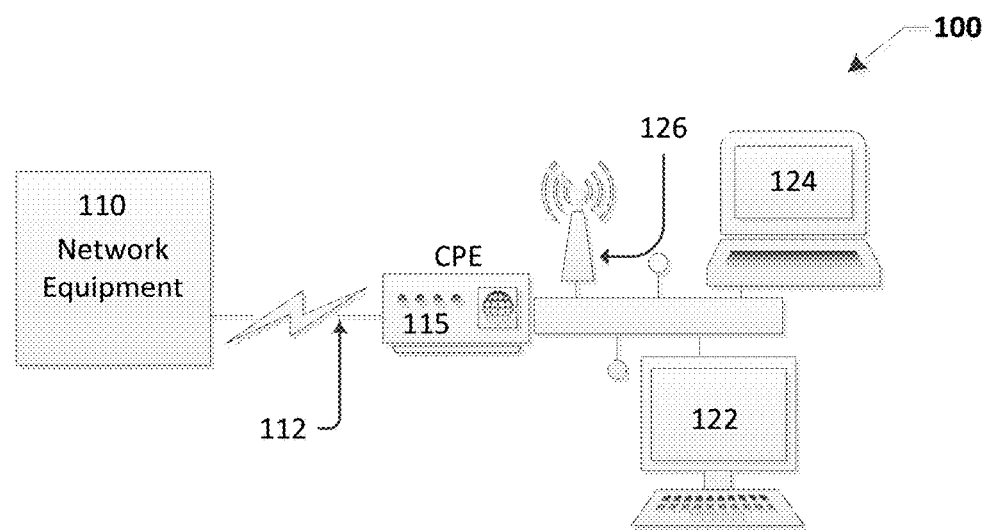
FIG. 1 shows a basic network diagram in which example embodiments of the invention may be utilized.

As shown in FIG. 1 below, a basic network 100 is shown with a network node 110, such as a cable provider Cable Modem Termination System (CMTS) or Internet service provider, which provides web access via an internet protocol (IP) interface to end user terminals 122, 124 including personal computers, laptops, wireless access points, via a network connection 112, such as a combination of optical fiber from a service provider head end to an exchange terminal, transformed from optical to electrical signals and delivered to end users, generally over a coaxial cable though inventive embodiments are in no way limited to any particular network configuration. In order to receive, demodulate, and access signals from network node 110 in the downstream via connection 112, end user terminals 122, 124, 126 may require customer premise equipment (CPE) such as a cable modem (CM) 115.

A cable modem termination system or CMTS 100 is a piece of equipment, typically located in a cable company's headend or hubsite, which is used to provide high speed data services, such as cable Internet or Voice over Internet Protocol, to cable subscribers by way of their CM.

Figure 2:
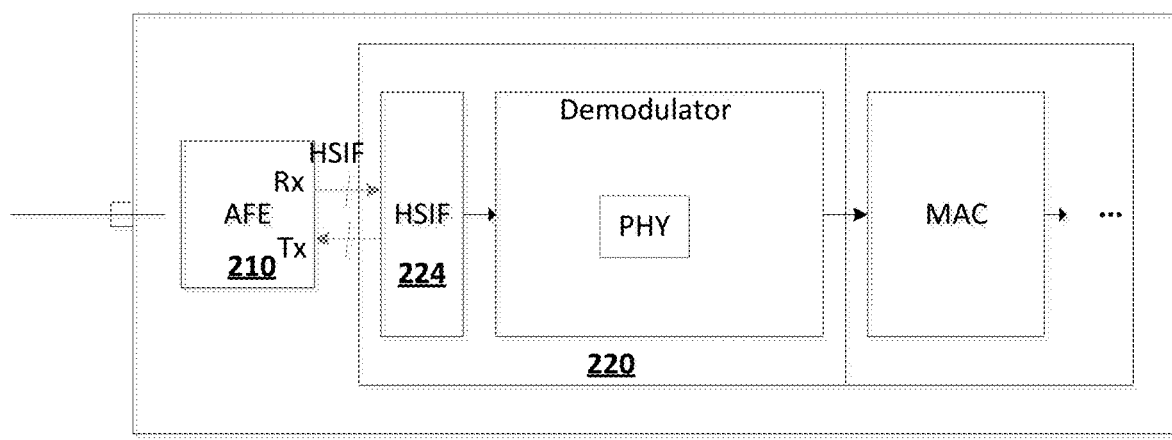
FIG. 2 shows a functional block diagram of a communication device according to various embodiments of the invention.

Referring to FIG. 2, a functional block diagram of a cable modem (CM) having a high-speed serial interface (HSIF) according to one or more inventive embodiments will now be explained. A cable modem 200 according to certain example embodiments, may include an analog front end (AFE) module 210 and a digital radio processor module 220. A high-speed serial interface 224 provides 8b/10b encoded data and status framing between the analog and digital modules 210 and 220. Optionally, digital tuner module 220 may include MAC layer functionality 250 as well.

In certain embodiments, the modem 200 and high speed serial interface (HSIF) between AFE 210 and digital radio 220 may support DOCSIS 3.1 with 12-bit I/O 600 Msps sampling for handling 32 upstream and downstream OFDM channels. To this end, modem 200 HSIF may support two lanes for legacy quadrature amplitude modulation (QAM) DOCSIS channels between AFE 210 and digital radio 220, another three lanes for 14-bit 250 Msps I/O samples to transmit two OFDM channels in the downstream.

As an example, digital radio processor 220 may be implemented in some embodiments, as a System on a Chip (SoC) which includes PHY layer functionality 226, e.g., PHY layer digital demodulation and decoding and, optionally, medium access control (MAC) layer 250 supporting networking functionality. The analog front end (AFE) 210, in certain embodiments, may comprise a full spectrum sampling tuner that integrates low noise amplifier (LNA)/automatic gain control (AGC), analog/digital converters (ADCs/DACs), channelizers, power amplifiers, mixer, local oscillator (LO), phase locked loop(s) (PLL), etc., although specific functionalities of the AFE and digital radio processor may be modified to a designer's discretion. High-speed Serial Interface (HSIF) 224 is a system and protocol that carries digital data between analog front end (AFE) 210 and digital tuner 220 and vice versa.

In various embodiments, the HSIF serial interface 224 provides a digital transmission scheme which streams a plurality of 8b/10b encoded frames bi-directionally and which are constantly transmitted between AFE 210 and digital radio 220 through a serial bus connection (i.e., one in each direction, or "bi-directionally"). In one example embodiment, there are two types of frames send bi-directionally: a data frame; and a status frame. Status frames can be used either to deliver status information between AFE 210 and digital tuner 220, or to serve as filler. In some embodiments, status frames may be used as fillers which are inserted asynchronously into the stream of frames to match the data rate to the HSIF serial rate (i.e. when there is no available data frame ready for transmission, a status frame is sent as a filler frame instead).

Figure 3:
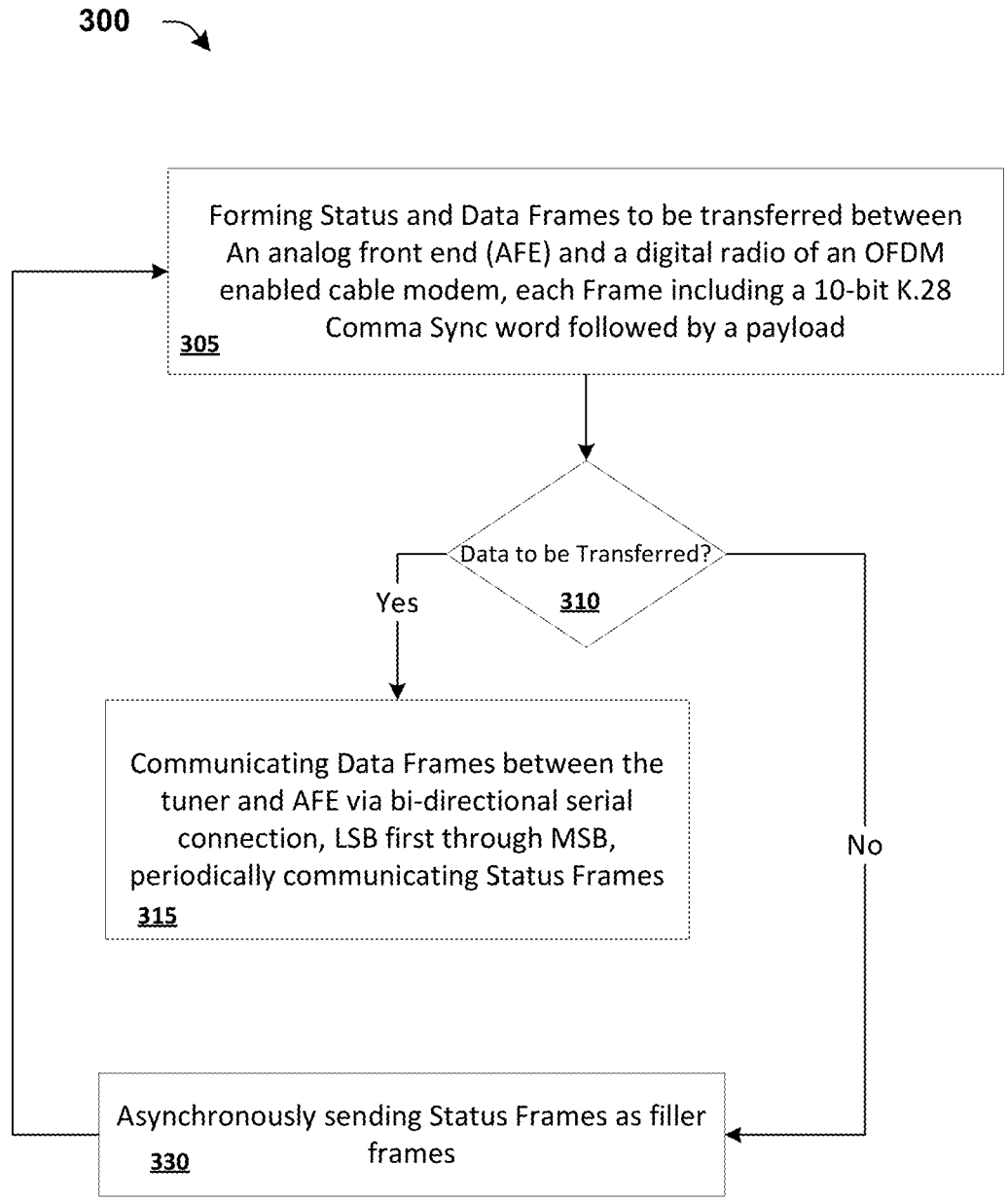
FIG. 3 shows a process for communicating OFDM channels between an analog front end (AFE) and digital radio according to one or more embodiments of the invention.

FIG. 3 shows an example process 300 high speed serial interface communications in an OFDM transceiver between an analog front end and digital radio processor may include forming 305 data and status frames to be transferred between the AFE and the digital radio, the data and status frames including a 10-bit comma sync word to identify the type of frame being sent, and for data frames, attaching a payload of a plurality of data samples (e.g., I/O digital samples in the downstream and digital data in the upstream). If 310 there is data or commands to be transferred in either direction, the data/command is placed in payloads of the frames and sent 315 over a bi-directional serial connection between AFE and digital radio. In preferred embodiments, data is transferred 315 in order of least significant bit (LSB) to most significant bit (MSB), with status frames transferred 315 periodically between data frames. If 310 no data is available for transfer, e.g., data frames are completed 315, status frames may be sent 330, preferably asynchronously, as filler frames between AFE and digital radio to mate the overall data throughput rate of the modem. In this manner, frames are continuously transferred through the HSIF so the overall OFDM transceiver data rate is matched by the high-speed serial interface.

Figure 4:
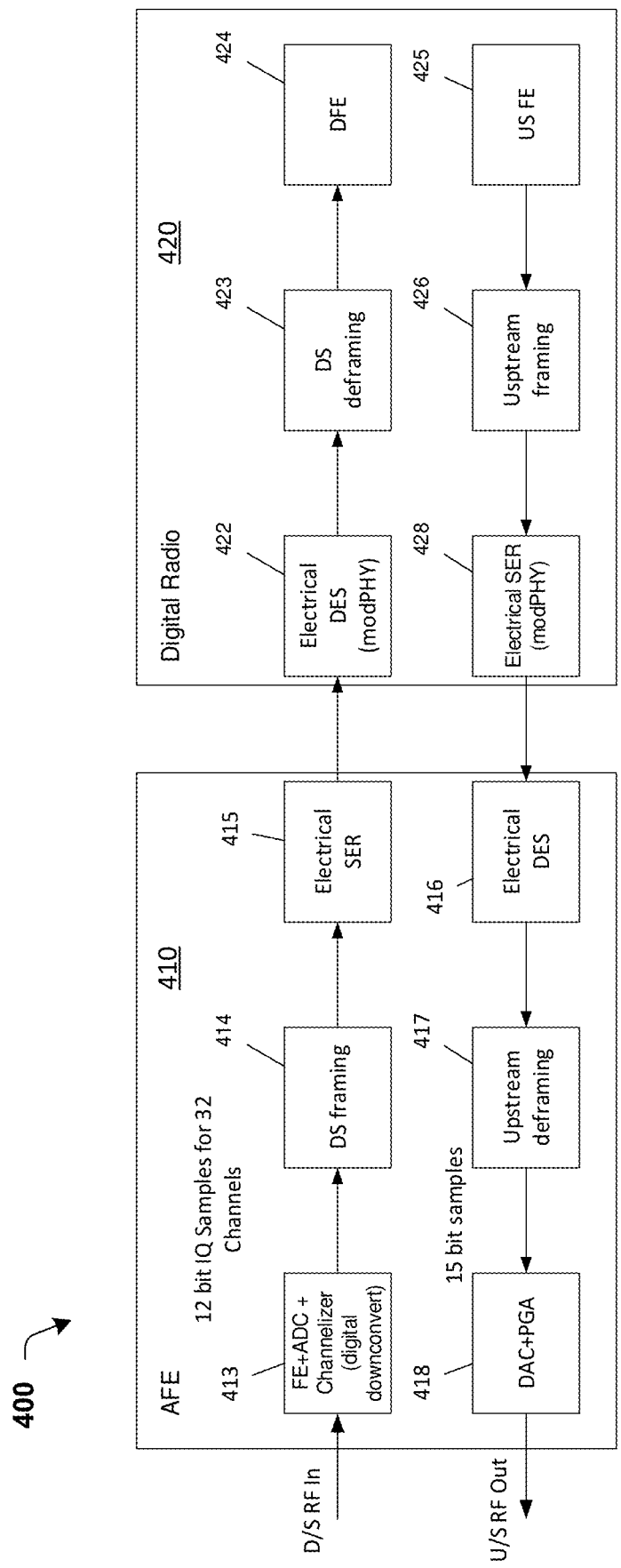
FIG. 4 shows a functional block diagram of an OFDM transceiver according to other embodiments.

Turning to FIG. 4, a more specific example embodiment of a communication device 400 operative to send/receive OFDM signals and compose and transfer data and status frames as discussed above, includes an analog front end (AFE) 410 for receiving and transmitting OFDM signals. In certain embodiments the AFE 410 includes a front end analog to digital downconverter 413 for analog down conversion of received OFDM signals, a downstream (D/S) framer 414 and a serializer 415, the framer and serializer configured to frame and serialize the down converted digital samples and transfer them to digital radio circuit 420 in the frame formats and protocols discussed herein. In certain embodiments AFE 410 may further include an upstream (U/S) circuit portion having a deserializer 416, a deframer 417 and an upconverter 418, including a digital-to-analog converter (DAC) and programmable gain amplifier (PGA), operative to deserialize, deframe and upconvert digital data received from digital radio/tuner circuit 420 to analog form to send OFDM communications from modem 400.

Similarly, digital radio 420 may include a deserializer 422, a deframer 423 and downstream digital processing module 424 to process deframed digital I/O samples from AFE 210. Additionally, digital radio 420 may include upstream processing module 425, framer 426 and serializer 427 for passing digital data to AFE 410 for transmission in OFDM channels. It is noted, that while various functional block items may be shown separately for functional understanding, actual components or circuitry may be combined in a same element. For example, a ser/des circuit may be a single circuit though depicted separately in FIG. 4 similar to other functional block elements in AFE 210 and digital radio processor 220 as would be understood by one of ordinary skill in the art.

Referring to FIGS. 5-8, according to certain example embodiments, upstream and downstream frames 500, 600, 700, 800, consist of a 10 bit K.28 Comma Sync word followed by a payload. In various embodiments, different K.28 words are used to distinguish between data (e.g., K28.5) and status (e.g., K28.1) frames. Also, in certain preferred embodiments, payloads of data frames are encoded using a standard 10/8-bit encoding. Therefore, the total length of frames (in bits) of these embodiments, is always a multiple of 10 (or 8 before encoding). In preferred embodiments, frames are fed least significant bit (LSB) first, to most significant bit (MSB) last, over a serial bus where Bit 0 refers to the LSB. Table 1 below shows an example embodiment for frame structure.

TABLE 1

HSIF Basic Frame Structure

| 8-bit words | Name | Content | Description |
|---|---|---|---|
| 1 | Sync | Sync placeholder. To be converted to 10 bit K28.5 or K28.1 symbol | Comma symbol is always the first data in the stream. K28.5 is for Data Frame. K28.1 is for Status Frame |

TABLE 1-continued

HSIF Basic Frame Structure

| 8-bit words | Name | Content | Description |
|---|---|---|---|
| 1 | Header | Packet Information such as Data/Status, Valid/Invalid, Reserved. | Bits 7, 6 indicate that this frame is Data Frame (11) or Status Frame (00). Bit 5 is Validity bit. Bit 5 = 1 is for a Valid packet, Bit 5 = 0 is for Invalid packet. Bit 4 is frame parity indication bit. Bit 4 = 1 is for black frame. Bit 4 = 0 is for white frame Bit 3 is reserved for DAC turn and turn off signaling |
| | Payload | Payload | Data Payload |
| 2 | Parity | Cyclic Redundancy Check (RC)16 or Reed Solomon (RS) encoding | Either CRC or RS encoding covering the data bytes from Header byte to the end of the payload. |

Frame synchronization is achieved when the K.28 comma symbols are found in their nominal position S1 times sequentially, where S1 is preferably a programmable value. The nominal position (S1) may depend on the mix of the data and status frames in the stream. The frame synchronization may considered to be lost when the frame synchronization symbol is not detected a specific number of times (S2) in a specified number of consecutive frames (S3), wherein S2 and S3 also preferably programmable. In certain preferred embodiments, an error in the sync word will not cause sync loss or packet loss.

In certain example embodiments, the payload of the frames may be followed by redundant bytes, which can be used for error detection and/or error correction. Example options of error detection/correction, referred to herein as "parity check" may include, cyclic redundancy check (CRC) that allows for frame detection only, or Reed Solomon forward error correction (FEC) block code, that will enable frame correction and/or detection. The specific parity check selected is in the discretion of the network architect based on the desired complexity and results.

Downstream Channelized Data Structure and Framing

Figure 5:
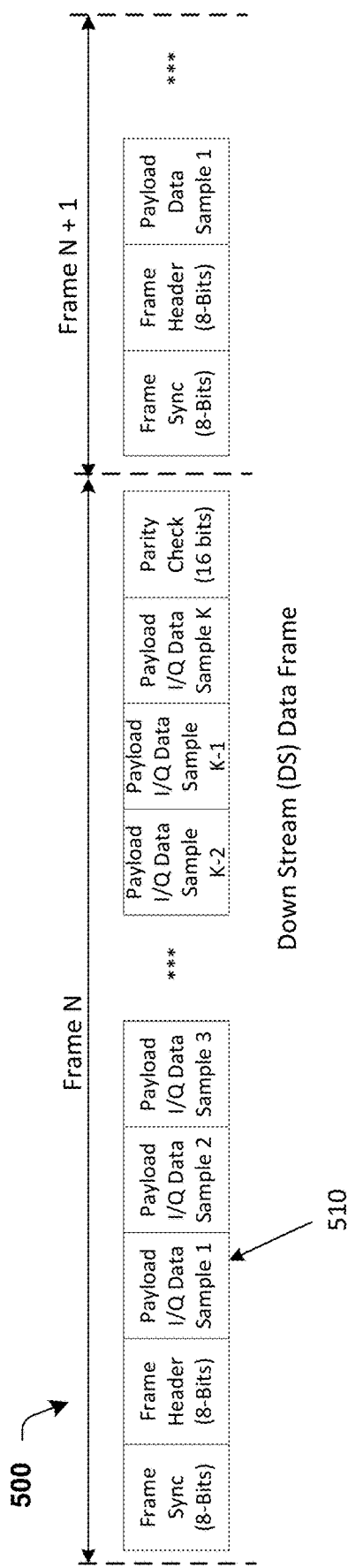
FIGS. 5 and 6 show illustrative examples of downstream data and status frames according to various embodiments.

An example embodiment of downstream data frame 500 is shown in FIG. 5. Here, the payload of the data frame 500 includes the complex baseband samples of two downstream RF OFDM channels sent through three logical lanes. Each logical lane carries I and Q samples of the two OFDM channels per assignment pattern in Table 2 below.

TABLE 2

Sample arrangement of 2 OFDM channels over 3 logical lanes
(Channel 1 samples = numbers; Channel 2 samples = letters)

| Lane 1 | 1 | 3 | 4 | 6 | — | — | — |
|---|---|---|---|---|---|---|---|
| Lane 2 | 2 | B | 5 | e | — | — | — |
| Lane3 | a | C | d | f | — | — | — |

The data rate for each channel is equal to 250 mega samples per second (Msps) per I as well as per Q of each channel. The rate of the complex samples rate over each logical lane is 250*2 channels/3 lanes Msps. In certain preferred embodiments, the format is 2's compliment. In case a certain channel is not active, zeros are transmitted instead of samples.

Assignment between the physical lanes to logical designations of Lane 1, Lane 2, Lane 3 should preferably be configurable on both the serial interface transmitter and receiver of the AFE and the digital radio.

Frame start times at the transmitter may preferably be aligned, and should start with the same color indication (e.g., black or white). Data samples are sent sequentially, while the color indication is toggled (e.g., black, white, black, white, etc.). The color of a frame is indicated in the header. In some preferred embodiments, the receiver will ensure that frames from the three lanes belong to the same color. It is assumed that skew between lanes will never be large enough to skip a frame.

Figure 6:
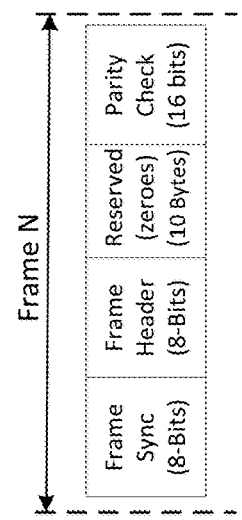

Downstream data and status frame contents are shown in FIGS. 5 and 6 as well as Tables 3 and 4 below:

TABLE 3

Downstream (DS) Data Frame Format

| 8-bit words | Content | Description |
|---|---|---|
| 1 | Sync | Data Frame Sync |
| 1 | Header | Data Frame Header. LSB first, MSB last. |
| 238 | 68 I/Q pairs of samples | 14 bits per sample. I first, Q second. LSB first, MSB last. Per pattern on Error! Reference source not found.. |
| 2 | Parity | Cyclic Redundancy Check (CRD) or Reed Solomon Forward Error Correction (FEC) Block Encoding |

FIG. 6 shows an illustrative example of a downstream status frame 600 according to various embodiments. Frame 600 may include the details in Table 4 below:

TABLE 4

Downstream (DS) Status Frame Format

| Bytes | Name | Description |
|---|---|---|
| 1 | Sync | Status Frame Sync |
| 1 | Header | Status Frame Header |
| 10 | Reserved [Currently Unused, filled with zeros] | |
| 2 | Parity | Cyclic Redundancy Check (CRC) or Reed Solomon Forward Error Correction (FEC) Block Encoding |

Each 8 bit word (Sync, Header and Parity) is also fed LSB first, MSB last. In some embodiments, the ratio of the data/status frames is 5:1 when the status frame size is 14.

Half Rate Mode (HM):

In Half Rate Mode, in one embodiment, the SerDes rate is 3 Gbps, half the rate of the Full Mode. The rate of the samples sent over each lane in this embodiment is equal to 250/3 Msps, which is exactly half of the rate of the Full Mode. The Half Rate frame structure is equal to structure for the Full Rate mode, except that the stuffing of samples into the payload of data frames is different as shown in Table 5 because only one OFDM channel is being framed.

TABLE 5

Half Rate Channel to Lane Designation

| Lane 1 | 1 | 4 | 7 | 10 | — | — | — |
|---|---|---|---|---|---|---|---|
| Lane 2 | 2 | 5 | 8 | 11 | — | — | — |
| Lane 3 | 3 | 6 | 9 | 12 | — | — | — |

Upstream DAC Data Structure and Framing

Figure 7:
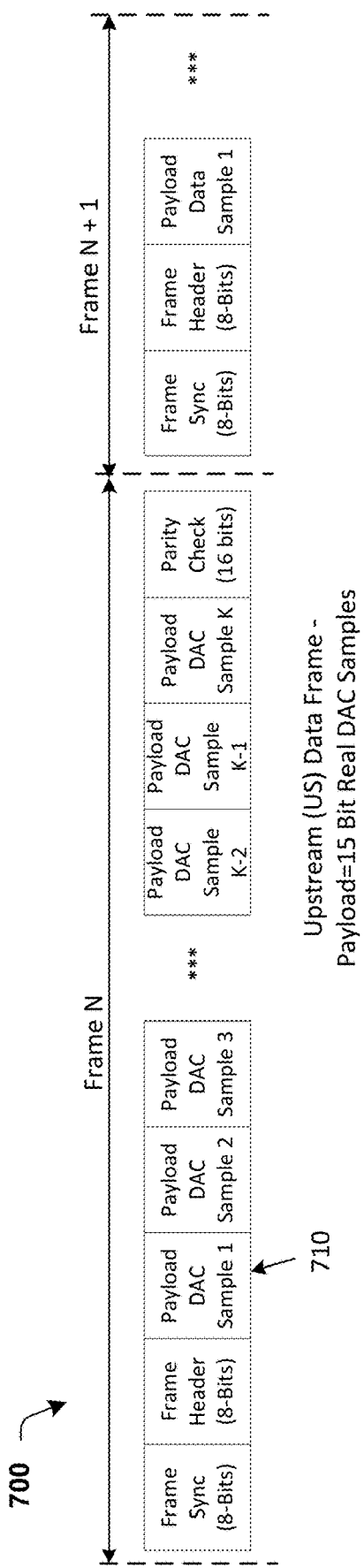
FIGS. 7 and 8 show illustrative examples of upstream data and status frames according to various embodiments.
Figure 8:
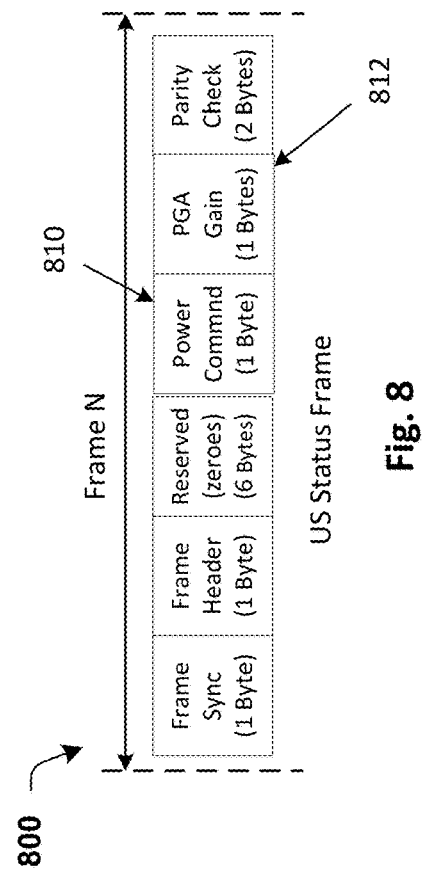

Example embodiments of upstream data frames 700 and status frames 800 are illustrated in FIGS. 7 and 8, respectively. In the upstream direction, samples are sent over the HSIF at a rate of 600 Msps, 15 bit samples, 710. These upstream samples comprise a signal that includes all of the upstream channels modulated on their corresponding RF frequencies inside the upstream range. This data can be subsequently fed directly to the DAC for controlling (via status frame commands 810, 812) and analog upconversion into OFDM RF channels (via data frames) by the AFE after deserializing and deframing through the high-speed serial interface.

In certain preferred embodiments for upstream Full Mode, all the samples from the digital radio are framed, serialized and sent through a two serial lanes, such that the odd samples are sent to one serial lane and the even samples are sent to the second serial lane. The AFE HSIF receiver preferably has a software programmable option to configure which lane is odd or even for upstream sampling. When not transmitting any data, the HSIF upstream (U/S) will send status frames as fillers. Again, the constant frame transmission upstream, with filler frames sent asynchronously when no data samples are needed to be sent, enables the HSIF transmission rate to match the overall upstream data rate.

In FIG. 7, an example upstream data frame 700 may include the information shown in Table 6 below:

TABLE 6

U/S Data Frame Format

| 8-bit words | Name | Description |
|---|---|---|
| 1 | Sync | Data Frame Sync |
| 1 | Header | Data Frame Header. LSB first, MSB last. |
| 120 | Data Samples | FM: 64 even or odd consecutive 15-bit samples<br>Each 15 bit sample is fed LSB first, MSB last.<br>DFM: 64 consecutive 15-bits samples |
| 2 | Parity | CRC or RS FEC |

In FIG. 8, an example upstream status frame 800 may include the information shown in Table 6 below:

TABLE 7

U/S Status Frame Format

| Bytes | Name | Description |
|---|---|---|
| 1 | Sync | Status Frame Sync |
| 1 | Header | Status Frame Header |
| 6 | Reserved [filled with zeros] | |
| 1 | POWER MODE COMMAND | A command to the AFE to enter a certain Power Saving Mode. |
| 1 | PGA GAIN | Describes the last Gain that was sent to the PGA through a dedicated serial interface |
| 2 | Parity | CRC or RS FEC |

According to certain embodiments, the upstream ratio of data/status frames is 3:1, when Status frame size is 12.

Decimated Half and Full Modes

In half mode framing and channel to logical lane assignments are identical except that the sample rate is scaled to 300 Msps. In decimated Full Mode samples are sent at 300 Msps over one lane.

The foregoing description of architecture and processing may be implemented as a system on a chip (SoC) receiver for cable modems using DOCSIS 3.1 Hybrid Fiber Coax OFDM standard although it is not limited thereto. Specific hardware and software implementations for high-speed serial interface embodiments discussed herein, may include designs in application specific integrated circuits (ASICs), micro-controllers, digital signal processors (DSPs), programmable logic arrays, and/or as software/firmware to perform the processes described herein. In one example embodiment, filter switching signal, synchronization and messaging may be programmed in software instructions and executed, or caused to be when in operation, by a processor, or central processing unit (CPU) attached to the hardware demodulator, AFE and/or distributed/dedicated processing engine.

Figure 9:
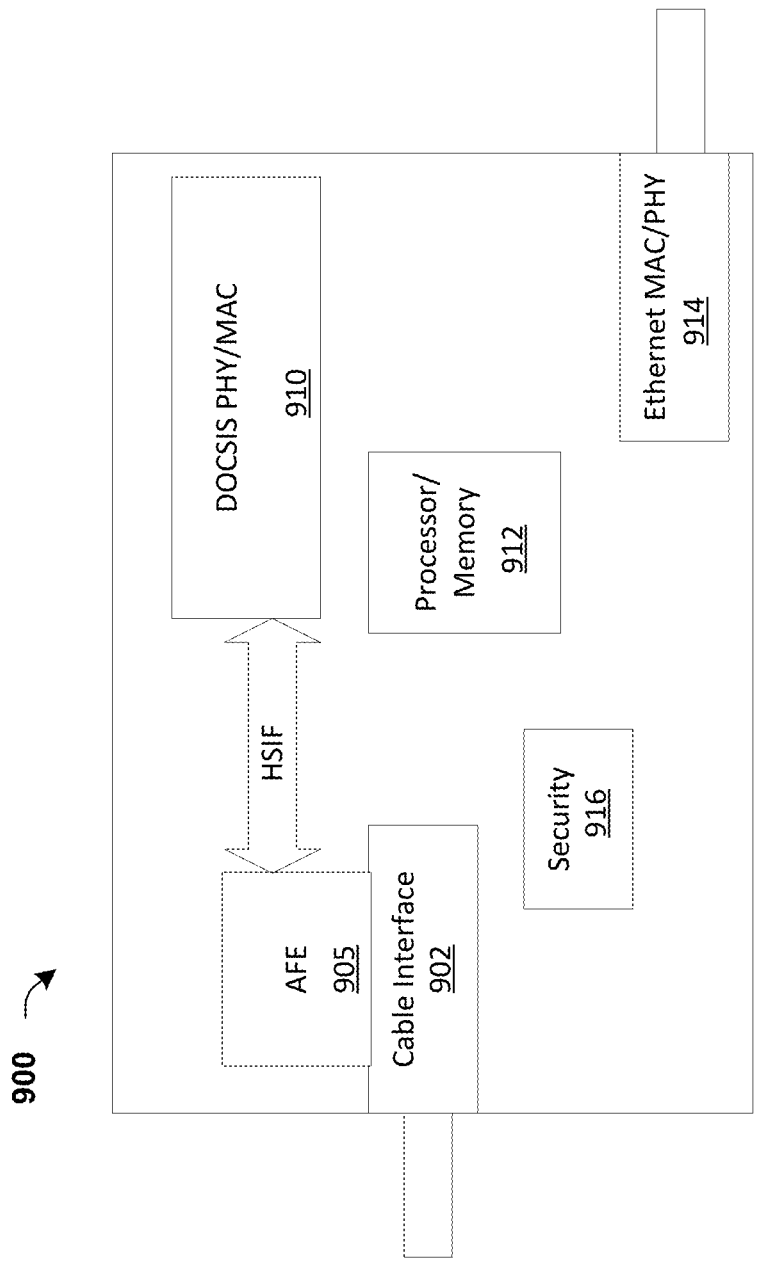
FIG. 9 shows an example functional block diagram of an OFDM-enabled modem with high speed serial interface according to one or more embodiments of the invention.

Referring to FIG. 9, an example functional block diagram of a modem 900 for OFDM communications with HSIF may include a receive interface 902 adapted to receive a wired or wireless DOCSIS 3.1 OFDM signal into the modem, an analog front end 905 and digital radio 910 connected to AFE 905 via a high-speed serial interface (HSIF) providing for the OFDM and legacy QAM channels as described herein.

In certain example embodiments, modem 900 may further include various other functional elements such as data link layer management circuit for packetization, managing flow control and higher layer levels of the OSI communications model, a processor/memory 912 adapted to control or provide processing/storage for various functional elements of modem 900 as desired. Furthermore, modem 900 may include security functionality 916 and client/user interface functionality 914, such as 10-100 Gb based Ethernet PHY/MAC processing and respective interface(s) to provide a user TCP/IP layer interface connectivity. It should be understood that modem 900 is only a representational functional example and various additional functionalities may be included as desired or those functionalities shown omitted if not needed or desired as known by one of ordinary skill in the art. Thus the specific example depicted and described is not intended to limit the embodiments of the invention in any manner.

DOCSIS 3.1 OFDM has been engineered by CableLabs and partners to increase the multi-gigabit data era on existing Hybrid Fiber-Coax (HFC) networks through improved spectral efficiency. Those of skill in the art would recognize modifications and substitutions of the elements, components and circuits described herein and possible and the invention is not limited to the specific examples in the detailed description but rather by the appended claims.

Example Embodiments

In a First Example Embodiments, a communication device in an orthogonal frequency division multiplexing (OFDM) enabled modem having an analog front end (AFE) and a digital radio may include: the AFE configured to send and receive OFDM modem channels, down convert received OFDM channels into a plurality of I and Q digital samples, the AFE including a high-speed serial interface (HSIF) to communicate the plurality of OFDM I and Q digital samples to the digital radio by continually generating and transferring downstream frames to the digital radio, wherein the downstream frames include data frames and status frames comprising a K.28 Comma Sync word followed by a payload.

According to a Second Embodiment, the communication device the First Embodiment is furthered wherein each frame comprises a plurality of 8/10b encoded words.

A Third Embodiment further defines the First wherein said downstream data frames include a frame sync, a header, 238 data payload words each including 68 I and Q digital sample pairs and wherein said downstream data frames including an error detection portion at their end.

A Fourth Embodiment may further define the Third wherein the error detection portion comprises one of a cyclic redundancy check (CRC) or Reed Solomon (RS) forward error correction block code.

A Fifth Embodiment further defines the First Embodiment wherein the HSIF of the AFE comprises a framer/deframer and a serializer/deserializer.

According to a Sixth Embodiment, the First Embodiment further includes the digitial radio including a second HSIF comprising a second framer/deframer and a second serializer/deserializer.

In a Seventh Embodiment, the First Embodiment further is defined wherein the AFE and HSIF are configured to down convert two downstream OFDM channels at a 6 gigabit per second (Gbps) serial rate transfer to the digital radio in a full rate mode (FM).

In an Eighth Embodiment, the First Embodiment is furthered wherein the AFE and HSIF are configured to down convert one downstream OFDM channel at a 3 Gbps serial rate transfer to the digital radio in a half rate mode (HM).

According to a Ninth Embodiment, a device configured to communicate orthogonal frequency division multiplexed (OFDM) signals upstream and downstream with a network, the device including: a digital radio including a high speed serial interface (HSIF) to receive digital samples of two OFDM downstream radio frequency (RF) channels and digital samples of two downstream quadrature amplitude modulated (QAM) channels from a separately provided analog front end (AFE), the HSIF sending and receiving constant frames over a bi-directional serial connection to and from the AFE in the form of status and data frames, said status and data frames comprising a K.28 Comma Sync Word and a payload.

In a Tenth Embodiment, the Ninth Embodiment is furthered, wherein each frame comprises a plurality of 8/10b encoded words and wherein a K28.5 identifies the data frames and K28.1 identifies status frames.

An Eleventh Embodiment further defines the Ninth, wherein said downstream data frames include a frame sync, a header, 238 data payload words each including 68 I and Q digital sample pairs and wherein said downstream data frames including an error detection portion at their end.

A Twelfth Embodiment further adds to the Eleventh Embodiment wherein the error detection portion comprises one of a cyclic redundancy check (CRC) or Reed Solomon (RS) forward error correction block code.

According to a Thirteenth Embodiment, the Ninth Embodiment is furthered, wherein the HSIF of the digital radio comprises a framer/deframer and a serializer/deserializer.

A Fourteen Embodiment further defines the Thirteenth by including the AFE including a second HSIF comprising a second framer/deframer and a second serializer/deserializer.

A Fifteenth Embodiment furthers the Ninth, wherein the digital radio and HSIF are configured to sample, frame and serialize upstream data to send to the AFE at a 600 Mega samples per second (Msps) rate for 15-bit real samples fed least significant bit (LSB) first to most significant bit (MSB).

A Sixteenth Embodiment includes a method for communicating data in a cable modem using a high-speed serial interface (HSIF), the method including: forming downstream frames comprising a K28 Comma word and a payload; and continually transferring the formed downstream frames including status frames and data frames, the data frames including complex baseband samples for OFDM channels received by said cable modem in their payload, wherein when no data is needed to be transferred, status frames are inserted asynchronously as filler frames.

A Seventeenth Embodiment furthers the Sixteenth, wherein the OFDM channels received by said cable modem are compliant with a Data Over Cable System Interface Specification (DOCSIS) 3.1 standard.

An Eighteenth Embodiment furthers the method of the Seventeenth by further including receiving upstream frames continuously, said upstream frames including status and data frames, wherein said upstream data frames include 15 bit-data samples in their payloads.

According to a Nineteenth Embodiment, either the First or Second Embodiments are furthered, wherein said downstream data frames include a frame sync, a header, 238 data payload words each including 68 I and Q digital sample pairs and wherein said downstream data frames including an error detection portion at their end.

In a Twentieth Embodiment, the First through Third and Nineteenth Embodiment may be furthered, wherein the HSIF of the AFE comprises a framer/deframer and a serializer/deserializer.

A Twenty-First Embodiment may include any of the First through Third or Nineteenth through Twentieth Embodiments of a device that further includes: the digitial radio including a second HSIF comprising a second framer/deframer and a second serializer/deserializer.

According to a Twenty-Second Embodiment, the First through Third or Nineteenth through Twenty-First Embodiments may be further defined, wherein the AFE and HSIF are configured to down convert two downstream OFDM channels at a 6 gigabit per second (Gbps) serial rate transfer to the digital radio in a full rate mode (FM).

A Twenty-Third Embodiment may further define the First through Third or Nineteenth through Twenty-Second Embodiments, wherein the AFE and HSIF are configured to down convert one downstream OFDM channel at a 3 Gbps serial rate transfer to the digital radio in a half rate mode (HM).

In a Twenty-Fourth Embodiment, the Ninth through Twelfth Embodiments are further defined, wherein the HSIF of the digital radio comprises a framer/deframer and a serializer/deserializer.

A Twenty-Fifth Embodiment further defines the Thirteenth by including the AFE and having a second HSIF comprising a second framer/deframer and a second serializer/deserializer.

According to a Twenty-Sixth Embodiment, a device for communicating data in a cable modem using a high-speed serial interface (HSIF), the device comprising: means for forming downstream frames comprising a K28 Comma word and a payload; and means for continually transferring the formed downstream frames including status frames and data frames, the data frames including complex baseband samples for OFDM channels received by said cable modem in their payload, wherein when no data is needed to be transferred, status frames are inserted asynchronously as filler frames.

A Twenty-Seventh Embodiment further defines the device of the Twenty-Sixth Embodiment by including means for receiving upstream frames continuously, said upstream frames including status and data frames, wherein said upstream data frames include 15 bit-data samples in their payloads.

A Twenty-Eighth Embodiment further defines those of the Third and Eleventh Embodiments, wherein the error detection portion comprises one of a cyclic redundancy check (CRC) or Reed Solomon (RS) forward error correction block code.

According to a Twenty-Ninth Embodiment the embodiments of any one of the First through Fourth Embodiments is furthered wherein the HSIF of the AFE comprises a framer/deframer and a serializer/deserializer.

In a Thirtieth Embodiment, the device of any one of the First through Fifth and Twenty-Ninth Embodiments further includes: the digitial radio including a second HSIF comprising a second framer/deframer and a second serializer/deserializer.

A Thirty-First Embodiment may further any of the First through Fifth and Thirtieth Embodiments, wherein the AFE and HSIF are configured to down convert two downstream OFDM channels at a 6 gigabit per second (Gbps) serial rate transfer to the digital radio in a full rate mode (FM).

A Thirty-Second Embodiment furthers any one of the First through Fifth and Twenty Ninth through Thirty-First Embodiments, wherein the AFE and HSIF are configured to down convert one downstream OFDM channel at a 3 Gbps serial rate transfer to the digital radio in a half rate mode (HM).

A Thirty-Third Embodiment furthers the First through Fifteenth and Nineteenth through Thirty-Second Embodiments, wherein said cable modem is compliant with a Data Over Cable Service Interface Specification (DOCSIS) 3.1 standard.

A Thirty-Fourth Embodiment furthers any of the First through Fifteenth and Nineteenth through Thirty-Third Embodiments, wherein the digital radio comprises a System on a Chip (SoC) coupled to the AFE via a bi-directional serial interface.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable, firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

The invention claimed is:

1. A communication device in an orthogonal frequency division multiplexing (OFDM) enabled modem having an analog front end (AFE) and a digital radio, the communication device comprising:
the AFE configured to send and receive OFDM modem channels, down convert received OFDM channels into a plurality of I and Q digital samples, the AFE including a high-speed serial interface (HSIF) to communicate the plurality of OFDM I and Q digital samples to the digital radio by continually generating and transferring downstream frames to the digital radio, wherein the downstream frames include data frames and status frames comprising a control portion followed by a payload, the downstream data frames including at least one redundant byte for error detection, the data frames including baseband samples for OFDM channels received by the communication device in their payload.

2. The communication device of claim 1 wherein each frame comprises a plurality of 8/10b encoded words.

3. The communication device of claim 1 wherein said downstream data frames include a frame sync, a header, 238 data payload words each including 68 I and Q digital sample pairs and wherein said downstream data frames including an error detection portion at their end that includes the at least one redundant byte.

4. The communication device of claim 3 wherein the error detection portion comprises one of a cyclic redundancy check (CRC) or Reed Solomon (RS) forward error correction block code.

5. The communication device of claim 1 wherein the HSIF of the AFE comprises at least one of: a framer, a deframer, a serializer or a deserializer.

6. The communication device of claim 5 further comprising:
the digital radio including a second HSIF comprising a second framer/deframer and a second serializer/deserializer.

7. The communication device of claim 1 wherein the AFE and HSIF are configured to down convert two downstream OFDM channels at a 6 gigabit per second (Gbps) serial rate transfer to the digital radio in a full rate mode (FM).

8. The communication device of claim 1 wherein the AFE and HSIF are configured to down convert one downstream OFDM channel at a 3 Gbps serial rate transfer to the digital radio in a half rate mode (HM).

9. The communication device of claim 6 wherein the digital radio comprises a System on a Chip (SoC) coupled to the AFE via a bi-directional serial interface.

10. The communication device of claim 1 wherein the OFDM-enabled modem is compliant with a Data Over Cable Service Interface Specification (DOCSIS) 3.1.

11. A device configured to communicate orthogonal frequency division multiplexed (OFDM) signals upstream and downstream with a network, the device comprising:
a digital radio including a high speed serial interface (HSIF) to receive digital samples of two OFDM downstream radio frequency (RF) channels and digital samples of two downstream quadrature amplitude modulated (QAM) channels from a separately provided analog front end (AFE), the HSIF sending and receiving constant frames over a bi-directional serial connection to and from the AFE in the form of status and data frames, wherein when no data is needed to be transferred, status frames are inserted asynchronously as filler frames, said status and data frames comprising a control portion and a payload.

12. The device of claim 11 wherein each frame comprises a plurality of 8/10b encoded words and wherein a K28.5 identifies the data frames and K28.1 identifies status frames.

13. The device of claim 11 wherein said downstream data frames include a frame sync, a header, 238 data payload words each including 68 I and Q digital sample pairs and wherein said downstream data frames including an error detection portion at their end that includes the at least one redundant byte.

14. The device of claim 13 wherein the error detection portion comprises one of a cyclic redundancy check (CRC) or Reed Solomon (RS) forward error correction block code.

15. The device of claim 11 wherein the HSIF of the digital radio comprises a framer/deframer and a serializer/deserializer.

16. The device of claim 15 further comprising:
the AFE including a second HSIF comprising a second framer/deframer and a second serializer/deserializer.

17. The device of claim 11 wherein the digital radio and HSIF are configured to sample, frame and serialize upstream data to send to the AFE at a 600 Mega samples per second (Msps) rate for 15-bit real samples fed least significant bit (LSB) first to most significant bit (MSB).

18. The device of claim 16 wherein the digital radio comprises a System on a Chip (SoC) coupled to the AFE via a bi-directional serial interface.

19. The device of claim 18 wherein the device comprises a cable modem compliant with a Data Over Cable Service Interface Specification (DOCSIS) 3.1 standard.

* * * * *